(12) United States Patent
Okumura et al.

(10) Patent No.: US 11,423,299 B2
(45) Date of Patent: Aug. 23, 2022

(54) DEVICE AND COMPUTER REALIZING CALCULATION OF RESERVOIR LAYER OF RESERVOIR COMPUTING

(71) Applicant: Hitachi, Ltd., Tokyo (JP)

(72) Inventors: Tadashi Okumura, Tokyo (JP); Mitsuharu Tai, Tokyo (JP); Masahiko Ando, Tokyo (JP); Sanato Nagata, Tokyo (JP); Norifumi Kameshiro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 938 days.

(21) Appl. No.: 16/204,461

(22) Filed: Nov. 29, 2018

(65) Prior Publication Data
US 2019/0164053 A1    May 30, 2019

(30) Foreign Application Priority Data
Nov. 30, 2017   (JP) .............................. JP2017-230341

(51) Int. Cl.
*G06N 3/08* (2006.01)
*G02F 1/21* (2006.01)

(52) U.S. Cl.
CPC .................. *G06N 3/08* (2013.01); *G02F 1/21* (2013.01); *G02F 1/212* (2021.01)

(58) Field of Classification Search
CPC .... G09G 2370/18; G06N 3/08; G06N 3/0445; G02F 1/21; G02F 1/212
See application file for complete search history.

(56) References Cited

U.S. PATENT DOCUMENTS

| | | | |
|---|---|---|---|
| 6,292,280 B1 | 9/2001 | Boffi et al. | |
| 7,321,882 B2* | 1/2008 | Jaeger | G06N 3/08 |
| | | | 706/30 |
| 9,165,246 B2* | 10/2015 | Pickett | G06N 3/0635 |
| 10,622,786 B2* | 4/2020 | Nakano | G06N 3/067 |
| 11,188,818 B2* | 11/2021 | Nakano | G06N 3/049 |
| 11,295,198 B2* | 4/2022 | Kanazawa | G06N 3/08 |
| 2004/0015459 A1 | 1/2004 | Jaeger | |
| 2014/0214738 A1 | 7/2014 | Pickett | |
| 2015/0009548 A1 | 1/2015 | Bienstman et al. | |

FOREIGN PATENT DOCUMENTS

| | | |
|---|---|---|
| JP | 11-191015 A | 7/1999 |
| JP | 2004-511866 A | 4/2004 |

OTHER PUBLICATIONS

Japanese-language Office Action issued in Japanese Application No. 2017-230341 dated Oct. 27, 2020 with English translation (eight (8) pages).

(Continued)

*Primary Examiner* — Jeff Piziali
(74) *Attorney, Agent, or Firm* — Crowell & Moring LLP

(57) ABSTRACT

A device includes an input unit, a nonlinear converter, and an output unit. The nonlinear converter and the output unit are connected via a connection path having a delay mechanism that realizes a feedback loop giving a delay to a signal. The delay mechanism includes a conversion mechanism that generates a plurality of signals with different delay times using the signal output from the nonlinear converter, generates a new signal by superimposing the plurality of signals, and outputs the generated signal to the output unit.

7 Claims, 11 Drawing Sheets

(56) References Cited

OTHER PUBLICATIONS

Appeltant L. et al., "Information Processing Using a Single Dynamic Node as Complex System", Nature Communications, Sep. 13, 2011, pp. 1-26, Macmillan Publishers Limited, (26 pages).

Larger L. et al., "Photonic Information Processing Beyond Turing: an Optoelectronic Implementation of Reservoir Computing," Optics Society of America, Jan. 27, 2012, pp. 3241-3249, vol. 20, No. 3, (nine (9) pages).

* cited by examiner (3) SAMPLING AND HOLDING PROCESSES (4) MASKING PROCESS, N-DIMENSIONALIZATION FIG. 10
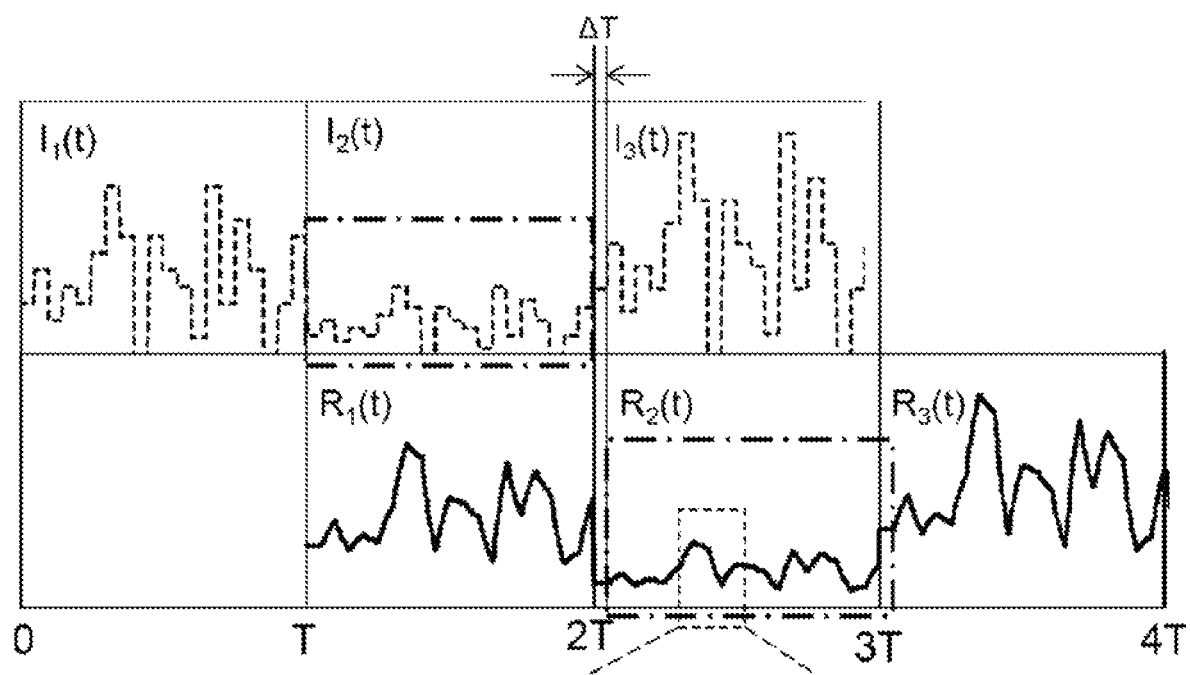
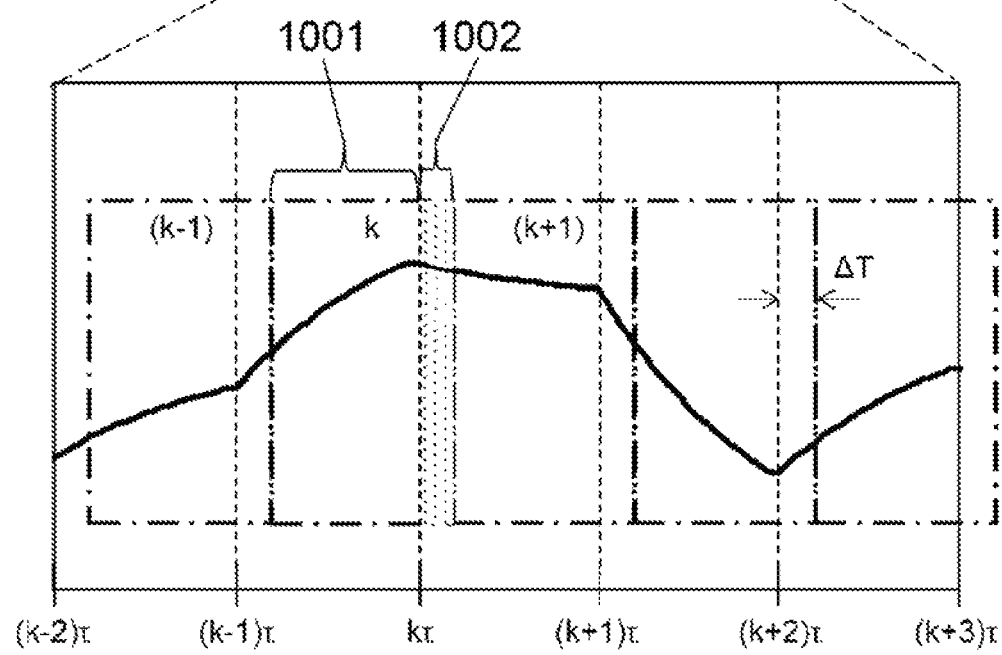

DEVICE AND COMPUTER REALIZING CALCULATION OF RESERVOIR LAYER OF RESERVOIR COMPUTING

CLAIM OF PRIORITY

The present application claims priority from Japanese patent application JP 2017-230341 filed on Nov. 30, 2017, the content of which is hereby incorporated by reference into this application.

BACKGROUND OF THE INVENTION

1. Field of the Invention

The present invention relates to reservoir computing.

2. Description of Related Art

In recent years, neural networks imitating cranial nerve networks have been used for machine learning. A neural network includes an input layer, an output layer, and a hidden layer. In the hidden layer, a desired output such as identification and prediction of information can be obtained by repeating simple conversion and converting input data into high dimensional data.

As an example of conversion in the hidden layer, there is nonlinear conversion imitating an firing of neurons. The firing of neurons is known as a nonlinear phenomenon in which a membrane potential increases and an output is changed when a potential exceeding a thresh old is input for neurons. In order to reproduce the above-described phenomenon, for example, sigmoid function expressed in Expression (1) is used.

[Expression 1]

$$f(x) = \frac{1}{1+\exp(-x)} \quad (1)$$

A neural network used to recognize an image or the like is called a feed-forward network. In the feed-forward network, data is sent in the order of an input layer, a hidden layer, and an output layer by handling a data group independent at a certain time as an input.

A neural network used to identify a moving image, a language, or the like is called a recurrent neural network (recursive neural network). In order to identify data which varies over time, time-series data is input since it is necessary to analyze correlation of data on a time axis. Therefore, in a hidden layer of a recurrent neural network, a process of handling previous data and current data is executed.

In a recurrent neural network, there is a problem that a learning process becomes complicated compared to a feed-forward network. There is also a problem that calculation cost of the learning process is high. Therefore, the number of neurons of a recurrent neural network is generally set to be small.

As a scheme for solving the problems, a scheme called reservoir computing is known (for example, see JP-T-2004-511866 and US Unexamined Patent Application Publication No. 2015/0009548). In the reservoir computing, connection of a network that forms a reservoir corresponding to a hidden layer is fixed, and connection of the reservoir and an output layer is learned.

As reservoir computing which can be mounted on a computer, a reservoir formed by a delay loop and one nonlinear node with time delay was proposed (for example, see APPELTANT Lennert, "Information processing using a single dynamical node as complex system." Nature communications 2 (2011): 468). APPELTANT Lennert, "Information processing using a single dynamical node as complex system." Nature communications 2 (2011): 468 discloses that a network of reservoir is constructed by equally dividing a delay interval into N pieces and considering each point as a virtual node. The reservoir disclosed in APPELTANT Lennert, "Information processing using a single dynamical node as complex system." Nature communications 2 (2011): 468 can be mounted on a computer as an electronic circuit, an optical circuit, or the like since the reservoir has a simple configuration.

Here, a concept of reservoir computing with time delay will be described with reference to FIG. 11. In addition, an example of the structure of a device that realizes a reservoir layer of reservoir computing of the related art will be described with reference to FIG. 12.

An input unit 1110 (an input layer) executes sampling and holding processes on input time-series data. In the sampling process, sampling is executed at each interval with a time interval T. Here, T corresponds to a delay time.

The input unit 1110 executes a masking process on data in each interval. In the masking process, data at one interval is divided into N pieces and is further modulated. N values included at the time interval T are handled as states of virtual nodes 1160 of the reservoir unit 1120.

The reservoir unit 1120 (a reservoir layer) includes one nonlinear node 1150 and a delay loop 1140 and outputs the states of the N virtual nodes 1160 subjected to nonlinear conversion to the output unit 1130. The output unit 1130 (an output layer) calculates a total sum of values obtained by multiplying the states of the virtual nodes 1160 by weighted coefficients.

In L. Larger, M. C. Soriano, D. Brunner, L. Appeltant, J. M. Gutierrez, L. Pesquera, C. R. Mirasso, and I. Fischer, Optics Express, 20, 2012, p. 3241, a reservoir device 1200 that realizes the reservoir unit 1120 is disclosed.

The reservoir device 1200 includes a power divider 1210, amplifiers 1220 and 1270, an optical modulator 1230, an optical receiver 1250, and a frequency filter 1260. The optical modulator 1230 and the optical receiver 1250 are connected via a long optical fiber 1240 to realize a feedback loop giving a delay to a signal.

The optical modulator 1230 is configured to realize the nonlinear node 1150 and a Mach-Zehnder (MZ) optical modulator is used as the optical modulator 1230 in L. Larger, M. C. Soriano, D. Brunner, L. Appeltant, J. M. Gutierrez, L. Pesquera, C. R. Mirasso, and I. Fischer, Optics Express, 20, 2012, p. 3241. The optical fiber 1240 has a configuration to generate a time delay.

A time necessary for propagation of the optical fiber 1240 is a time delay space, and N pulses of an optical signal propagating through the optical fiber 1240 are the states of the virtual nodes 1160. An optical signal which has propagated through the optical fiber 1240 is converted into an electric signal by the optical receiver 1250 to be divided into two pieces of signals. Each signal is output to devices that realize the amplifier 1270 and the output unit 1130. The signal output from the amplifier 1270 is input as a feedback signal to the power divider 1210.

SUMMARY OF THE INVENTION

In the reservoir computing using a delayed feedback system disclosed in APPELTANT Lennert, "Information processing using a single dynamical node as complex system." Nature communications 2 (2011): 468, and L. Larger, M. C. Soriano, D. Brunner, L. Appeltant, J. M. Gutierrez, L. Pesquera, C. R. Mirasso, and I. Fischer, Optics Express, 20, 2012, p. 3241, there is a problem that diversity of the connection between the nodes is low compared to a neural network and a reservoir computer, in which nodes are combined by a circuit as in APPELTANT Lennert, "Information processing using a single dynamical node as complex system." Nature communications 2 (2011): 468 and L. Larger, M. C. Soriano, D. Brunner, L. Appeltant, J. M. Gutierrez, L. Pesquera, C. R. Mirasso, and I. Fischer, Optics Express, 20, 2012, p. 3241 since the configuration of the networks is simple. Since the configuration of a network of nodes is a factor contributing to a computation ability, there is a problem that the computation ability is restricted in the reservoir computing using a delayed feedback system of the related art.

An object of the invention is to provide a device that has advantages of reservoir computing using a delayed feedback system and realizes a reservoir unit that has a diversity of connection between nodes.

BRIEF DESCRIPTION OF THE DRAWINGS

FIG. 10 is a diagram illustrating a concept of signal processing executed by a computer according to Example 3;

DESCRIPTION OF EMBODIMENTS

Figure 1:
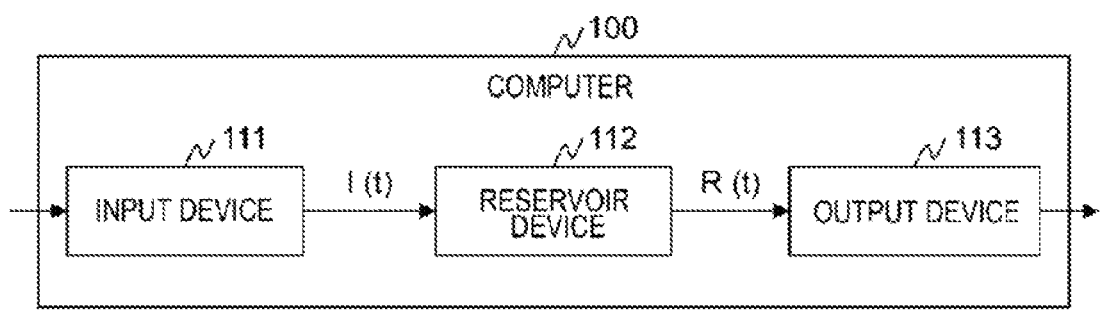
FIG. 1 is a diagram illustrating a configuration example of a computer realizing reservoir computing according to Example 1.

A representative example of the invention disclosed in the present specification is as follows. That is, a device realizes calculation of a reservoir layer of reservoir computing, and includes an input unit, a nonlinear converter, and an output unit, wherein the nonlinear converter and the output unit are connected via a connection path having a delay mechanism that realizes a feedback loop giving a delay to a signal to be propagated, the input unit outputs a first signal generated by superimposing processing results of an input signal and a previous input signal output from the output unit to the nonlinear converter, the nonlinear converter outputs a second signal obtained by executing nonlinear conversion on the first signal, the output unit generates a third signal based on a signal received via the connection path, outputs the third signal to the input unit as a processing result of the previous input signal, and outputs the third signal to an external device, and the delay mechanism includes a conversion mechanism that generates a plurality of fourth signals with different delay times using the second signal, generates a fifth signal by superimposing the plurality of fourth signals, and outputs the fifth signal to the output unit.

According to an embodiment of the invention, it is possible to provide a device that realizes a reservoir with a diversity of connection between the nodes. Due to the diversity of the connection between nodes, it is possible to improve a computation ability of reservoir computing using a delayed feedback system. Problems, configurations, and advantages other than the foregoing problems, the configurations, and the advantages are apparent in description of the following examples.

Hereinafter, configuration concepts and embodiments of the invention will be described specifically and in detail with reference to the drawings. Throughout all the drawings for describing the embodiments, the same reference numerals are given to portions with the same functions and the description thereof will not be repeated. The following drawings are drawings for describing examples of the embodiments and the sizes of the drawings and scales in the description of the examples are not necessarily identical.

Example 1

Figure 3:
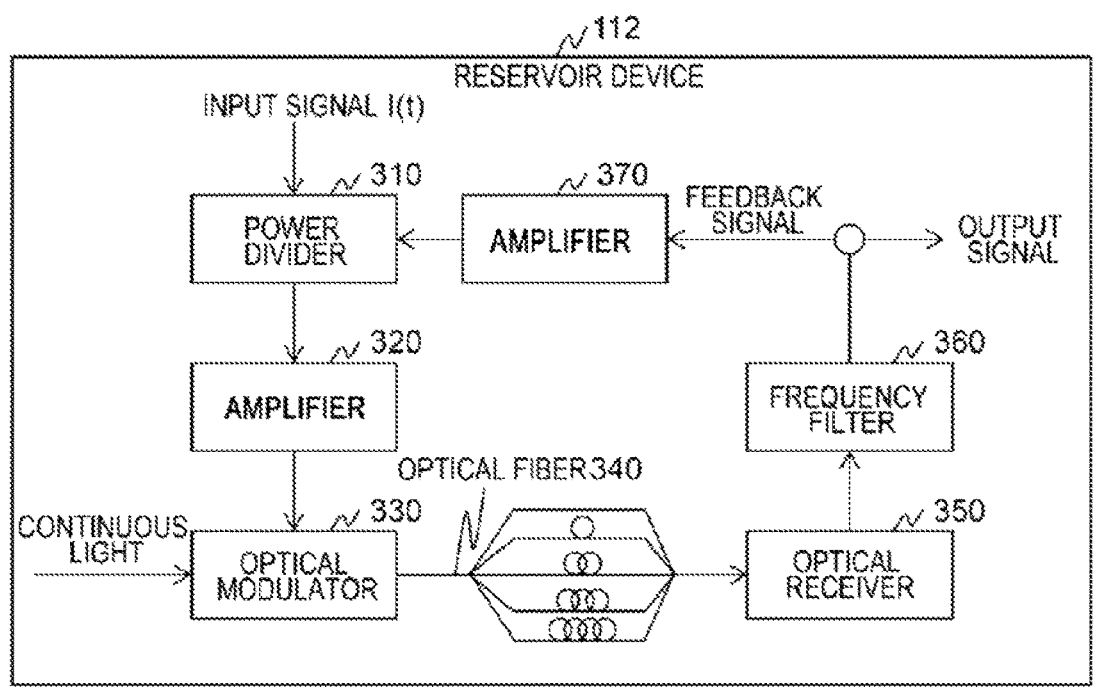
FIG. 3 is a diagram illustrating a configuration example of a reservoir device according to Example 1.
Figure 4:
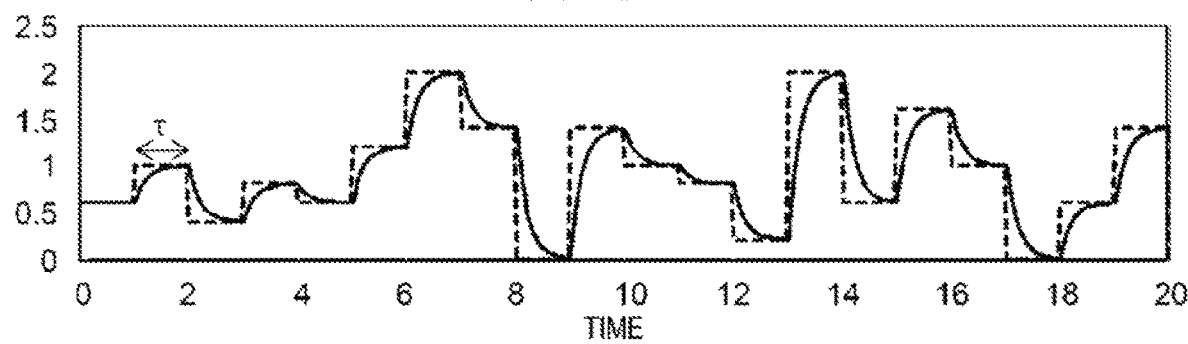
FIG. 4 is a diagram illustrating an example of a signal input to a frequency filter according to Example 1.

FIG. 1 is a diagram illustrating a configuration example of a computer realizing reservoir computing according to Example 1. FIGS. 2A to 2D are diagrams illustrating examples of processes executed by an input device according to Example 1. FIG. 3 is a diagram illustrating a configuration example of a reservoir device according to Example 1. FIG. 4 is a diagram illustrating an example of a signal input to a frequency filter 360 according to Example 1.

A computer 100 that realizes reservoir computing includes an input device 111, a reservoir device 112, and an output device 113.

The input device 111 is a device that realizes an input unit 1110 of the reservoir computing. Here, a process executed by the input device 111 will be descried with reference to FIGS. 2A to 2D.

Figure 2A:
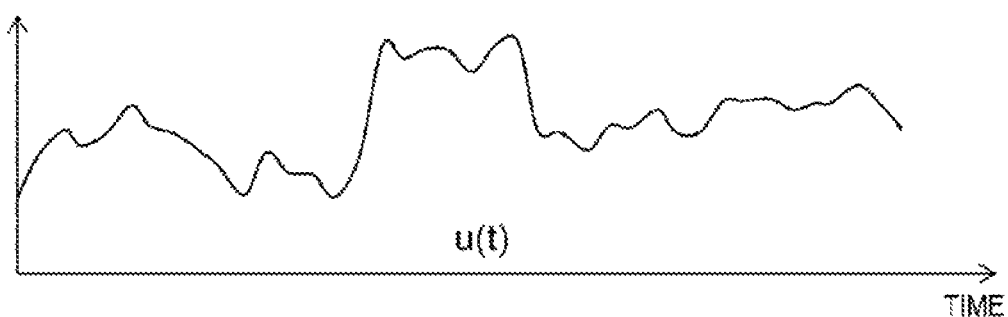
FIG. 2A is a diagram illustrating an example of a process executed by an input device according to Example 1.
Figure 2B:
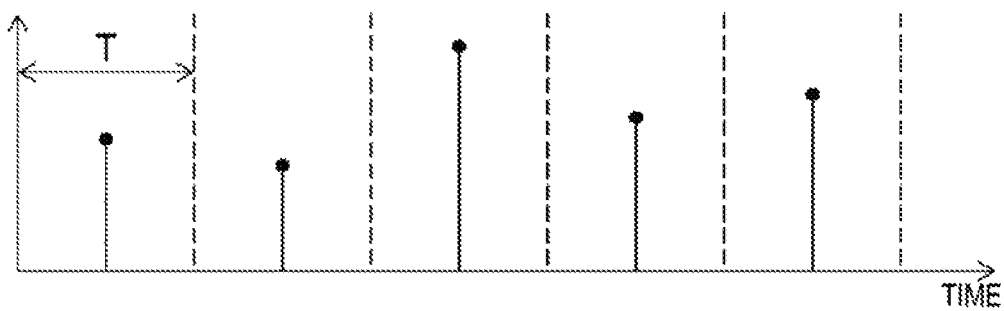
FIG. 2B is a diagram illustrating an example of a process executed by the input device according to Example 1.
Figure 2C:
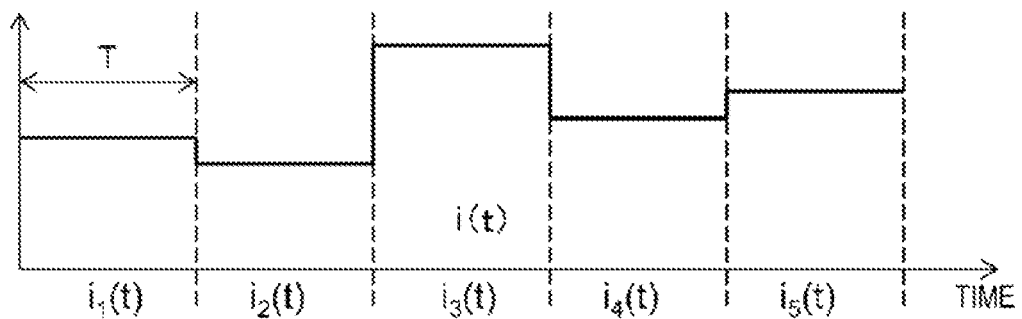
FIG. 2C is a diagram illustrating an example of a process executed by the input device according to Example 1.
Figure 2D:
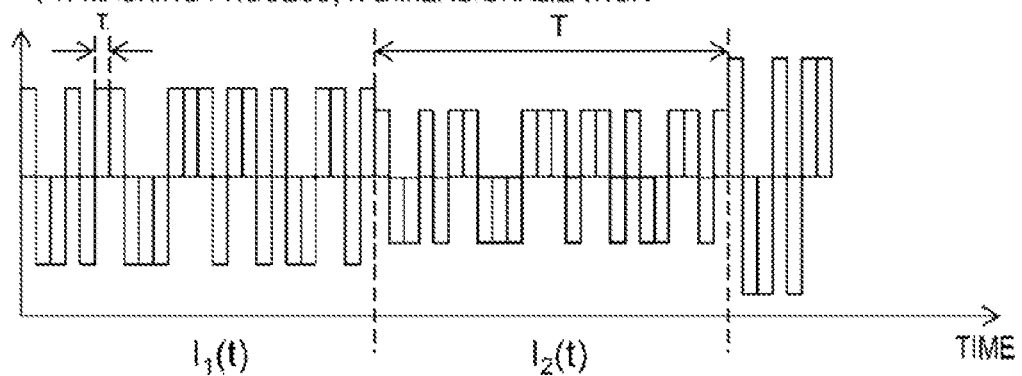
FIG. 2D is a diagram illustrating an example of a process executed by the input device according to Example 1.

When an input of time-series data u(t) illustrated in FIG. 2A is received, the input device 111 executes sampling and holding processes of sampling the time-series data u(t) and holding values sampled at a time interval T to calculate a stream $i_j(t)$, as illustrated in FIGS. 2B and 2C. Here, j is a subscript indicating a label of each interval and is an integer equal to or greater than 1.

The input device 111 executes a masking process of modulating an intensity of each stream $i_j(t)$ at each time interval τ to calculate an input stream $I_j(t)$. Thus, the input stream $I_j(t)$ illustrated in FIG. 2D can be obtained. In the example, intensity modulation is executed with binary values of −1 and +1. Here, τ satisfies Expression (2). N indicates the number of divisions at one interval. N corresponds to the number of virtual nodes 1160.

[Expression 2]

$$\tau = \frac{T}{N} \quad (2)$$

The modulation may be amplitude modulation or may be phase modulation. A modulation intensity may be a random binary bit string or may be a random multi-value bit string such as octal values or hexadecimal values. The modulation intensity may be a signal sequence indicating a continuous change in an intensity. In the case of modulation executed using a random binary bit string, there are advantages that a system configuration can be simplified and an input device can be realized using an existing device. When a random multi-value bit string or a signal indicating a continuous or chaotic change in the intensity is applied, diverse network dynamics can be caused compared to binary modulation. Therefore, a computation ability is improved.

The input device 111 outputs the input stream $I_j(t)$ corresponding to data of an N-dimensional vector to the reservoir device 112.

The reservoir device 112 is a device that realizes the reservoir unit 1120 formed by one nonlinear node 1150 with a time delay. The reservoir device 112 executes a process in which a time T is set as an execution period. The time T indicates a delay time (a length of a delay network). The nonlinear node 1150 can be realized using an element with nonlinear characteristics, such as an optical modulator, a semiconductor laser, and an optical amplifier.

Here, a specific configuration of the reservoir device 112 according to the example will be described with reference to FIG. 3. The reservoir device 112 includes a power divider 310, amplifiers 320 and 370, an optical modulator 330, an optical fiber 340, an optical receiver 350, and a frequency filter 360.

The power divider 310 superimposes an input signal output from the input device ill and a feedback signal output from the amplifier 370, and outputs the superimposed signal to the amplifier 320. The amplifiers 320 and 370 amplify electric signals. An attenuator may be provided instead of the amplifier 370.

The power divider 310 and the amplifier 320 function as an input unit, that inputs a signal to the delay loop 1140. The configuration realizing the input unit is an example and the invention is not limited thereto.

The optical modulator 330 converts an electric signal into an optical signal using a nonlinear input and output response sensitivity region. In the example, the optical modulator 330 of a Mach-Zehnder (MZ) interference type is used. A bias voltage and continuous light from a laser are input to the optical modulator 330 along with an electric signal.

The electric signal input to the optical modulator 330 is subjected to nonlinear intensity conversion and electric/optical conversion. As expressed in Expression (3), the optical modulator 330 outputs light obtained by sinusoidally modulating the intensity of the electric signal input along with a voltage V. A phase term ϕ of Expression (3) is a parameter which can be adjusted at the bias voltage.

[Expression 3]

$$P(V)=1+\sin(\omega V+\varphi) \quad (3)$$

For example, by fitting a range of an input voltage with a half period of a sinusoidal wave having an intensity increasing from 0 to 2, nonlinear electric/optical conversion similar to a sigmoid function of Expression (1) is executed. An optical signal is handled as data of the N-dimensional vector. The value of each component is a state of the virtual node 1160.

The optical fiber 340 has a mechanism that generates a delay in an optical signal, that is, realizes the delay loop 1140 of the reservoir unit 1120. In the example, a frequency of signal processing is set to 100 kHz, and a delay time is set to 10 μ seconds. In this case, when the length of the optical fiber 340 is set to about 2 km, a delay time of 10 μ seconds occurs in an electric signal output to the power divider 1210. When a frequency of a mask signal is set to 10 MHz (a pulse with of 100 ns), the reservoir device 112 functions as the reservoir unit 1120 including a network formed by 100 virtual nodes 1160.

In the example, a part of the optical fiber 340 is divided into a plurality of paths with different lengths. Each path is configured to become one path before being input to the optical receiver 350. Since the length of each path is different, a different time delay occurs in the optical signal flowing along each path. Accordingly, the plurality of paths with different lengths function as a conversion mechanism that generates optical signals with different delay times.

In the example, a part of the optical fiber 340 is divided into 5 paths with lengths of 1 m, 11 m, 21 m, 31 m, and 41 m. In the following description, a path with the length of 1 m is referred to as a first path, a path with the length of 11 m as a second path, a path with the length of 21 m as a third path, a path with the length of 31 m as a fourth path, and a path with the length of 41 m as a fifth path. In the optical fiber 340, a mechanism that changes the intensity of an optical signal propagating through each path is provided. The mechanism may be included in the conversion mechanism or may be provided as a mechanism different from the conversion mechanism.

In the example, the length of each path was set so that a delay time of the feedback signal which propagated through the third path from the power divider 310 and was input again to the power divider 310 is T. The intensities of the optical signals propagating through the first path, the second path, the third path, the fourth path, and the fifth path were set to 5%, 20%, 50%, 20%, and 5%.

When the optical signals pass through the optical fiber 340 with the above-described configuration and the third path is set as a standard of a relative time, a delay of −100 ns occurs in the first path, a delay of −50 ns in the second path, a delay of +50 ns in the fourth path, and a delay of +100 ns in the fifth path. Accordingly, by superimposing the optical signals with the delays, it is possible to embody dynamics to which influences from −100 ns to +100 ns are added.

The optical receiver 350 converts an optical signal into an electric signal. As the optical receiver 350, for example, a photodiode or the like is considered. The frequency filter 360 acquires an electric signal with a predetermined frequency component from an electric signal. The optical receiver 350 and the frequency filter 360 function as an output unit that outputs signals to the input unit and the output device 113. The configuration realizing the output unit is an example and the invention is not limited thereto.

The electric signal output from the frequency filter 360 is output to the output device 113 as an output signal, and is output to the amplifier 370 as a feedback signal. The power divider 310 superimposes the feedback signal and the input signal after 10 μ seconds, and outputs the superimposed signal to the amplifier 320.

The output device 113 multiplies each component of a signal corresponding to the data of the N-dimensional vector by a weight, and calculates a sum value of the components as an output value. The output value calculated by the output device 113 is a scalar value.

Each device has been described above. Next, characteristics of the reservoir device 112 according to the example will be described.

When the bandwidth of the frequency filter 360 or the optical receiver 350 is set to be smaller than a frequency of the mask signal, a waveform of an input signal indicated by a dotted line of FIG. 4 is distorted to a waveform indicated by a solid line by a transient response. This indicates that the electric signal of the time T is influenced by the electric signal a time (T−100) ns ago, that is, a state of the virtual node 1160 τ seconds ago.

Figure 14:
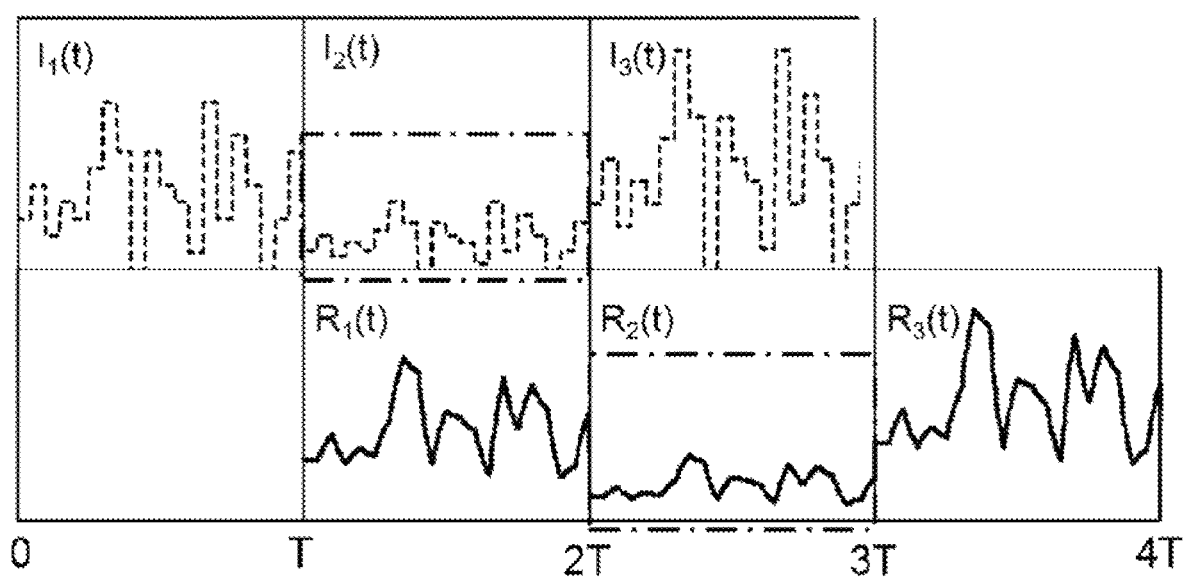
FIG. 14 is a diagram illustrating a concept of signal processing executed by a computer according to the related art.

Here, a difference between the reservoir device according to the related art and the reservoir device 112 according to the example will be described with reference to FIGS. 5, 6, and 14.

Figure 5:
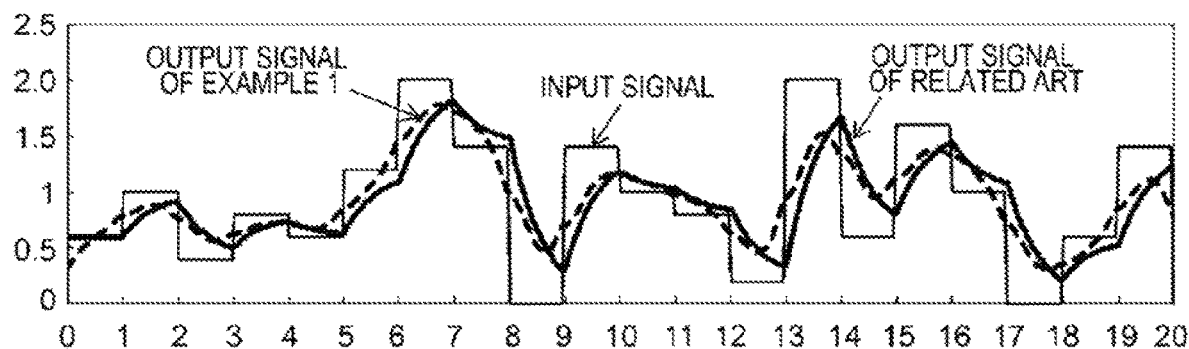
FIG. 5 is a diagram illustrating an example of an electric signal output by the reservoir device according to Example 1.

FIG. 5 is a diagram illustrating an example of an electric signal output by the reservoir device 112 according to Example 1.

In FIG. 5, the horizontal axis represents a time and the vertical axis represents an intensity of an output signal. Numbers on the horizontal axis indicate labels when one interval is divided into 20 pieces with a width τ. A rectangular graph indicates an input signal, a solid polygonal line graph indicates an output signal of the related art, and a dotted polygonal line graph indicates the output signal according to Example 1.

Figure 6:
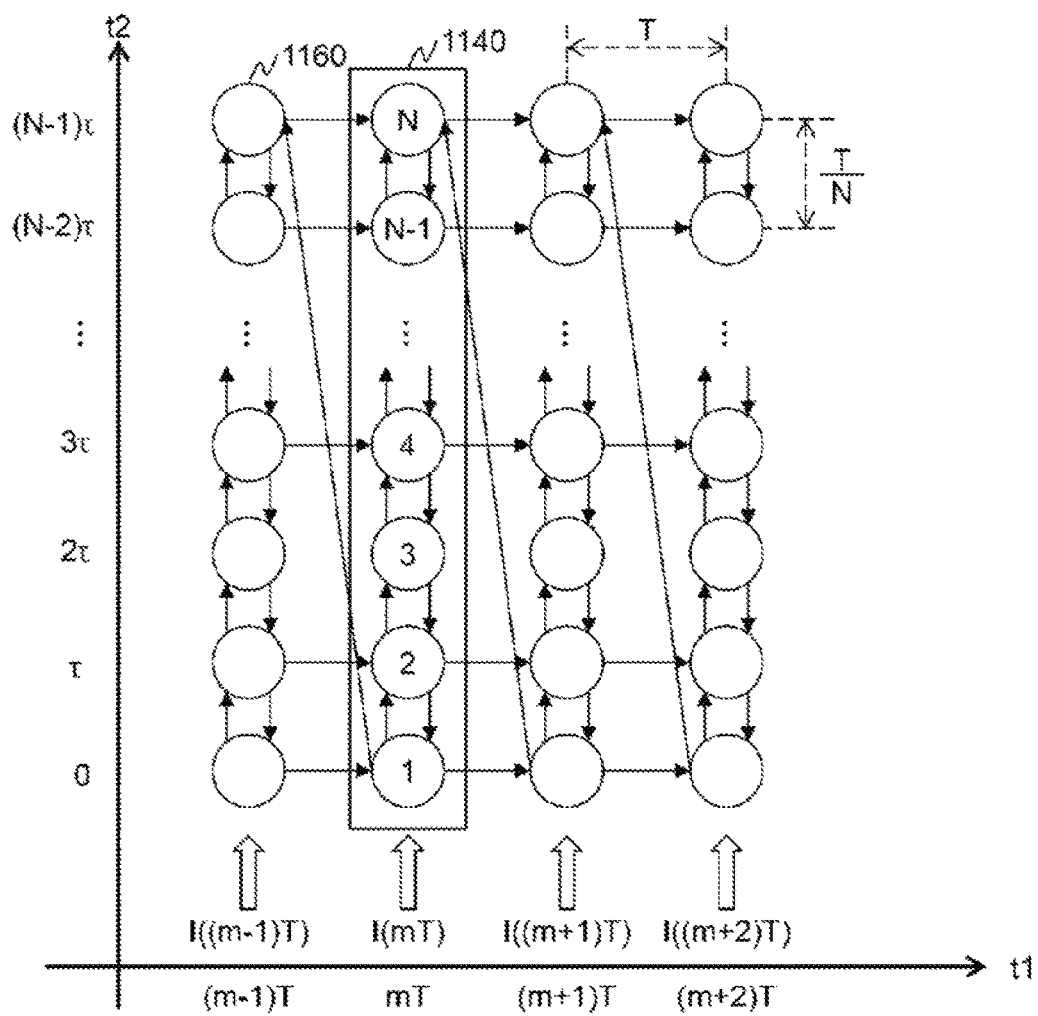
FIG. 6 is a diagram illustrating a configuration example of a network of virtual nodes formed by the reservoir device according to Example 1.
Figure 13:
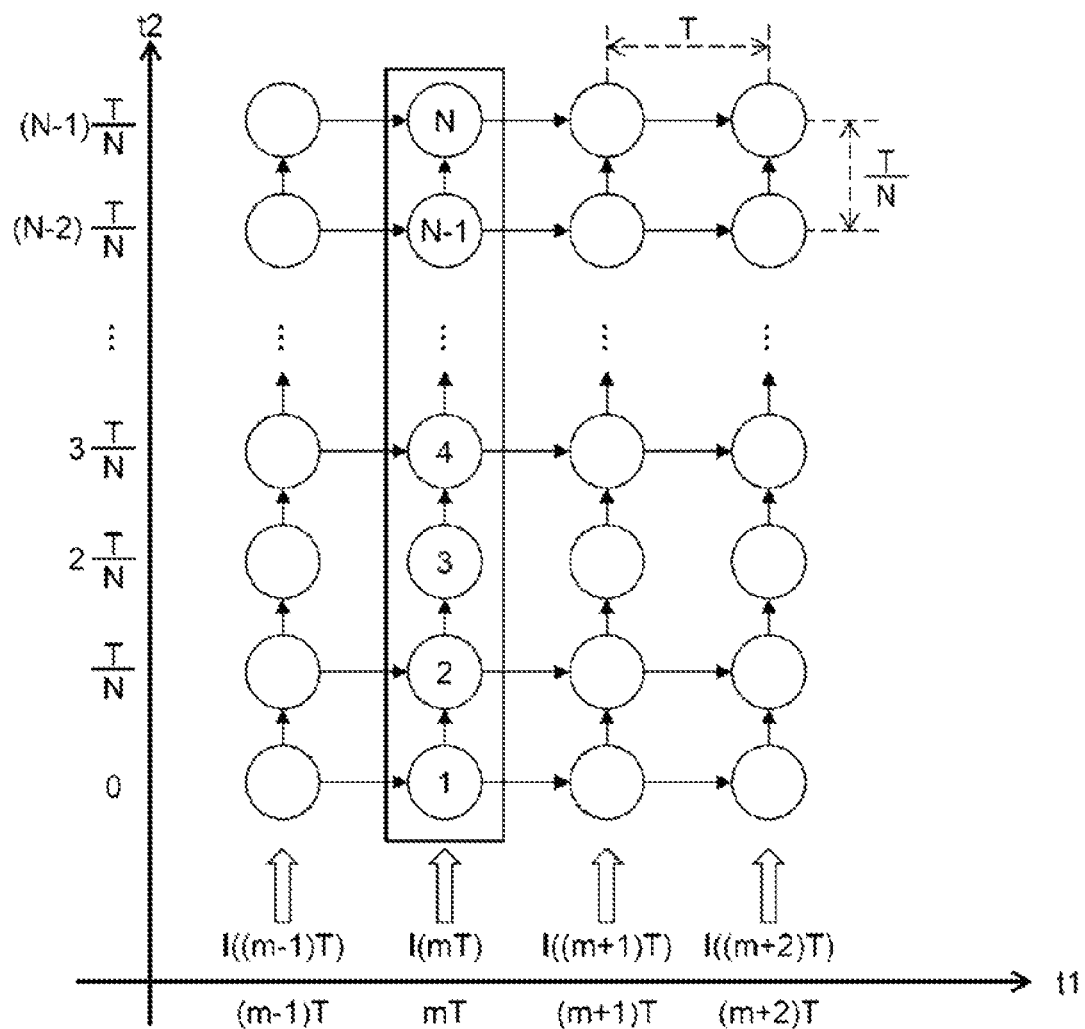
FIG. 13 is a diagram illustrating a configuration example of a network of virtual nodes formed by the reservoir device according to the related art.

FIG. 6 is a diagram illustrating a configuration example of a network of the virtual nodes 1160 formed by the reservoir device 112 according to Example 1. FIG. 13 is a diagram illustrating a configuration example of a network of the virtual nodes 1160 formed by the reservoir device according to the related art.

Figure 11:
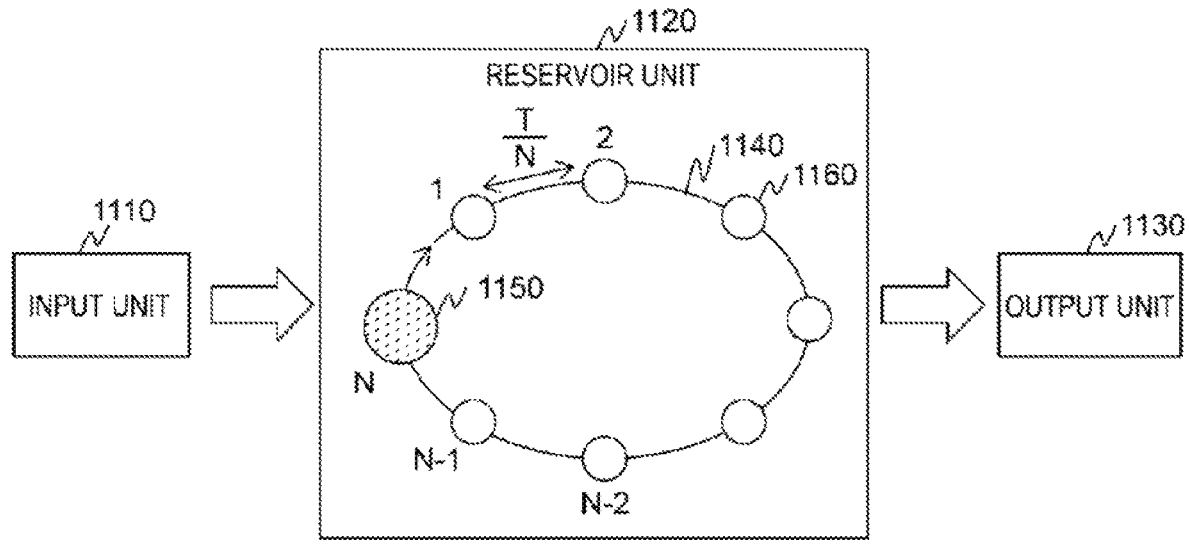
FIG. 11 is a diagram describing a concept of reservoir computing with a time delay according to the related art.

The horizontal axis t1 and the vertical axis t2 of FIGS. 6 and 13 represent a time. Here, t1 indicates an execution period of a process by the reservoir unit 1120. In the example, a pitch width of t1 is a delay time T. The vertical axis t2 represents a time difference between the virtual nodes 1160 included in the delay loop 1140. In the example, a pitch width of t2 is T. A rectangle of FIG. 6 indicates the delay loop 1140 illustrated in FIG. 11 and a circle indicates a virtual node 1160. The same applies to a rectangle and a circle of FIG. 13. A value written in a circle 601 indicates a label of the virtual node 1160.

The time T corresponds to an operation period of the whole computer including the reservoir device 1200. The time τ corresponds to an operation period in the reservoir unit 1120.

The superimposition of the input signal and the feedback signal can be described as a combination indicating the influence of the previous virtual nodes 1160 in a t1 direction. The transient response of the signal in the reservoir device 1200 can be described as a combination indicating the influence of the previous virtual nodes 1160 of the delay loop 1140.

Figure 12:
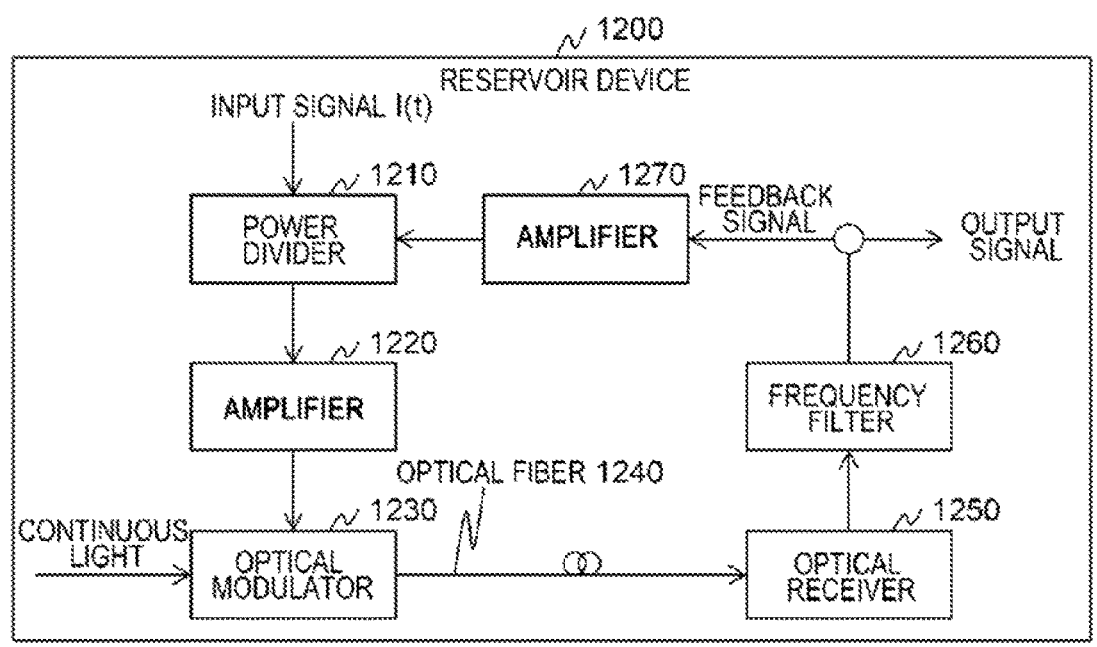
FIG. 12 is a diagram describing an example of the structure of a device that realizes a reservoir layer of the reservoir computing according to the related art.

In the reservoir device 1200 illustrated in FIG. 12, the transient response is realized by the frequency filter 1260. The transient response can be realized using a phenomenon such as a relaxation process associated with a lifetime and the spread of carriers of a semiconductor device.

As illustrated in FIG. 5, a pulsed input signal is converted into a signal with an exponentially transient response indicated by a solid line due to propagation through the frequency filter 1260. The transient response may be generated via a plurality of circuits or may be generated using a circuit other than the frequency filter 1260.

This conversion means that the virtual nodes 1160 are influenced by the previous states of the virtual nodes 1160 in an axis t2 direction. Accordingly, the reservoir device 1200 according to the related art forms a network of the virtual nodes 1160 illustrated in FIG. 13.

As illustrated in FIG. 13, a state of the k-th virtual node 1160 at the time mT is influenced by a k-th component of an input signal I(mT), a state of a (k−1)-th virtual node 1160 at a time mT, and a state of a k-th virtual node 1160 at a time (m−T.

In the network of the virtual nodes 1160 illustrated in FIG. 13, a combination of the virtual nodes 1160 is one direction with respect to any combination of the axis t1 and the axis t2. That is, a combination only in a direction from the past to the future. Compared to a neural network with a complicated combination, a diversity of node states is low, and a computation ability is restricted.

The reservoir device 112 according to the example divides an optical signal output from the optical modulator 330 into a plurality of paths with a minute delay time and collects the plurality of paths to one optical signal again. This manipulation has an effect of minutely widening a waveform of a signal indicating a state of each virtual node 1160 in a time direction. That is, this manipulation means that the influences of the minute times in the states of the virtual nodes 1160 at (t+kτ) are incorporated.

Accordingly, in the example, the signal indicated by a dotted line of FIG. 5 is output from the frequency filter 360. As illustrated in FIG. 5, the output signal according to the example has a different shape from an output signal according to the related art due to the above-described effect.

As apparent from the above description, the reservoir device 112 according to the example forms a network of the virtual nodes 1160 illustrated in FIG. 6.

As illustrated in FIG. 6, a state of the k-th virtual node 1160 at the time mT is influenced by a k-th component of an input signal I(mT), a state of a (k−1)-th virtual node 1160 at the time mT, a state of a (k+1)-th virtual mode 1160 at the time mT, and a state of a k-th virtual node 1160 at a time (m−T. In addition, when k is (N−1), (k+1) is assumed to be 0.

The network of the virtual nodes 1160 illustrated in FIG. 6 is an example and the invention is not limited thereto. By adjusting a delay time generated in the conversion mechanism, it is possible to form a network of the virtual nodes 1160 to have an influence of the other virtual nodes 1160 in the delay loop.

Next, the advantages of the reservoir device 112 according to Example 1 will be described. To verify the advantages according to the example, a time-series prediction task of predicting an intensity of a laser chaos was executed.

Figure 7A:
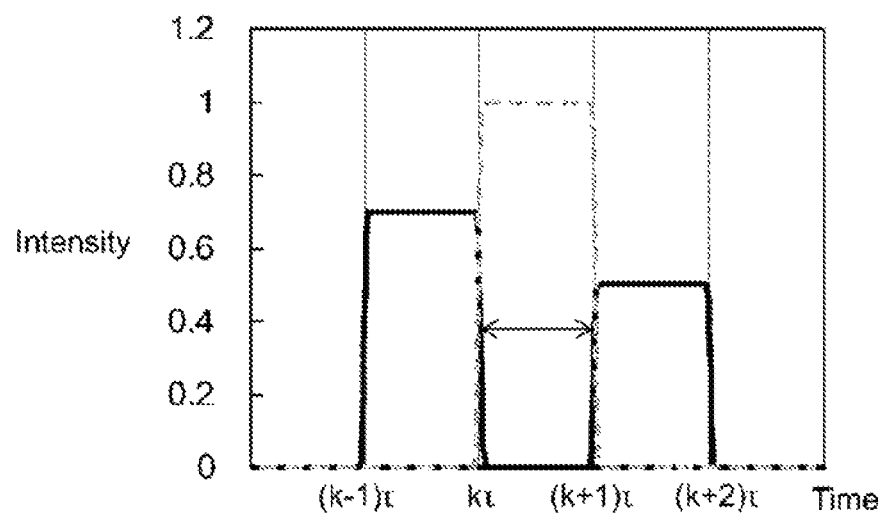
FIG. 7A is a diagram illustrating an example of a waveform of an optical signal propagating through an optical fiber according to Example 1.
Figure 7B:
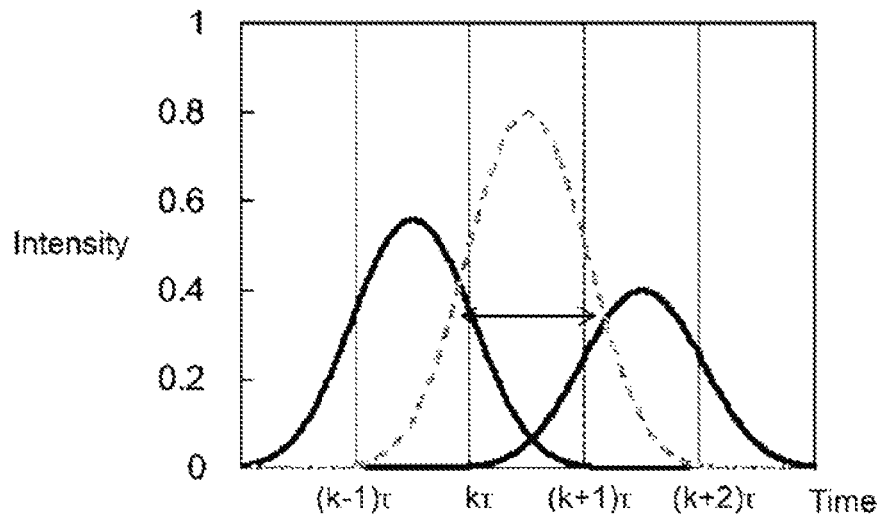
FIG. 7B is a diagram illustrating an example of a waveform of the optical signal propagating through the optical fiber according to Example 1.
Figure 7C:
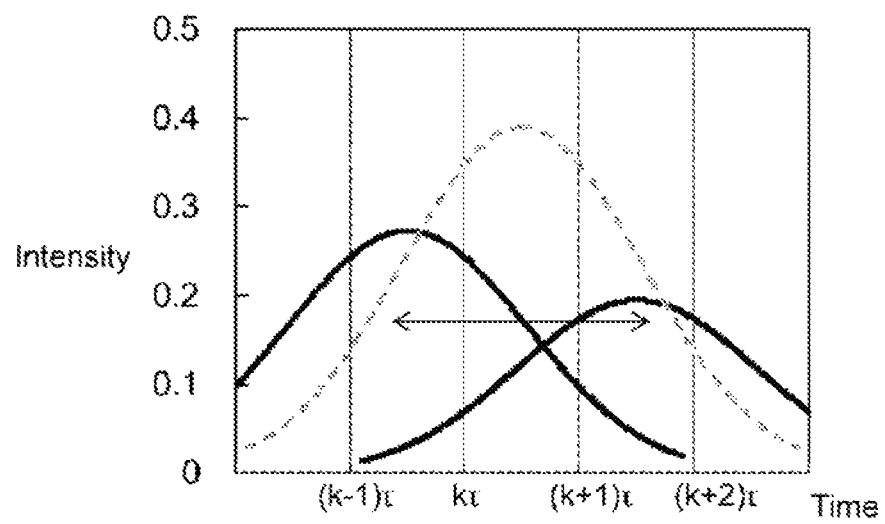
FIG. 7C is a diagram illustrating an example of a waveform of the optical signal propagating through the optical fiber according to Example 1.
Figure 8:
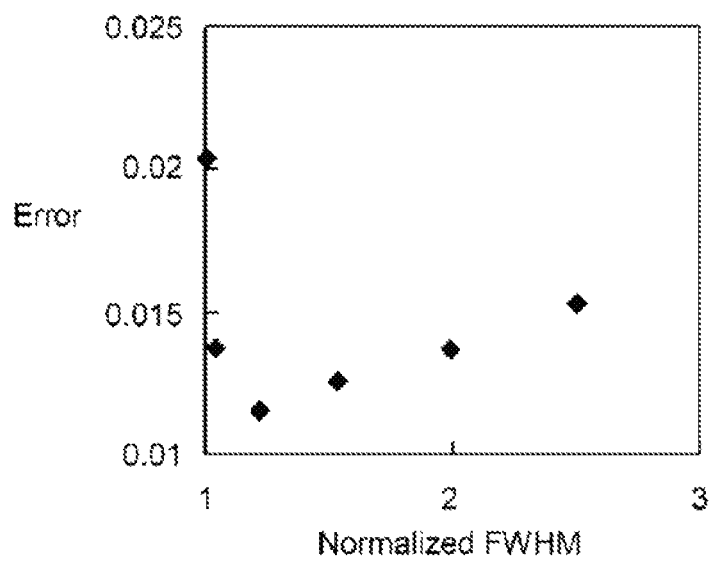
FIG. 8 is a diagram illustrating a relation between a predicted error and a pulse width of an event when using a computer with the reservoir device mounted thereon is used according to Example 1.

FIGS. 7A to 7C are diagrams illustrating examples of waveforms of optical signals propagating through the optical fiber 340 according to Example 1. FIG. 8 is a diagram illustrating a relation between a predicted error and a pulse width of an event where a computer with the reservoir device 112 mounted thereon is used according to Example 1.

In FIGS. 7A to 7C, the horizontal axis represents a time and the vertical axis represents an intensity. In FIG. 8, the horizontal axis represents a magnification of an optical signal to a half value width according to the related art, and the vertical axis represents a predicted error (NMSE: normalized mean square error). Here, a pulse width of an optical signal output from the optical modulator 330 was set to 100 ns. Since the optical signal is rectangular, the half value width is 100 ns.

FIG. 7A illustrates a part of the waveform of the optical signal output from the optical fiber 340 according to the related art which does not have a conversion mechanism. In this case, a magnification of the half value width is 1.0, and the predicted error (NMSE: normalized mean square error) was 0.021.

FIGS. 7B and 7C illustrate a part of the waveforms of the optical signals output from the optical fiber 340 having a conversion mechanism. In the example, an optical signal with a pulse shape corresponding to the state of one virtual node 1160 is converted into an optical signal with a waveform widened on the time axis by the conversion mechanism.

In FIG. 7B, the conversion mechanism was adjusted to have the half value width of the optical signal with 120 ns. In this case, the magnification of the half value width was 1.2 and the predicted error was 0.011. In FIG. 7C, the conversion mechanism was adjusted to have the half value width of the optical signal with 250 ns. In this case, the magnification of the half value width was 2.5 and the predicted error was 0.015.

From the above-described verification, it was revealed that the computation ability was improved by using the reservoir device 112 according to the example. In the verification, it was proved that the computation ability was further raised when the conversion mechanism was adjusted so that the magnification of the half value width was about 1.1 to 1.5.

In Example 1, the optical modulator 330 and the optical receiver 350 are connected using the optical fiber 340, but an optical waveguide may be used. Even when the optical waveguide is used, the same advantages can be obtained as in FIG. 3 by dividing a part of the optical waveguide into a plurality of paths.

According to Example 1, it is possible to provide the reservoir device 112 that realizes the reservoir unit 1120 including the network of the virtual nodes 1160 having the diversity of the connection between the nodes. Thus, it is possible to improve the computation ability while maintaining the advantages of the reservoir computing using a delayed feedback system.

Example 2

Example 2 is different from Example 1 in a method of realizing a conversion mechanism. Hereinafter, difference between Example 1 and Example 2 will be mainly described.

The computer 100 according to Example 2 has the same configuration as that according to Example 1. The input device 111 and the output device 113 according to Example 2 have the same configurations as those according to Example 1. In Example 2, the configuration of the reservoir device 112 is different from that of the reservoir device 112 of Example 1.

Figure 9:
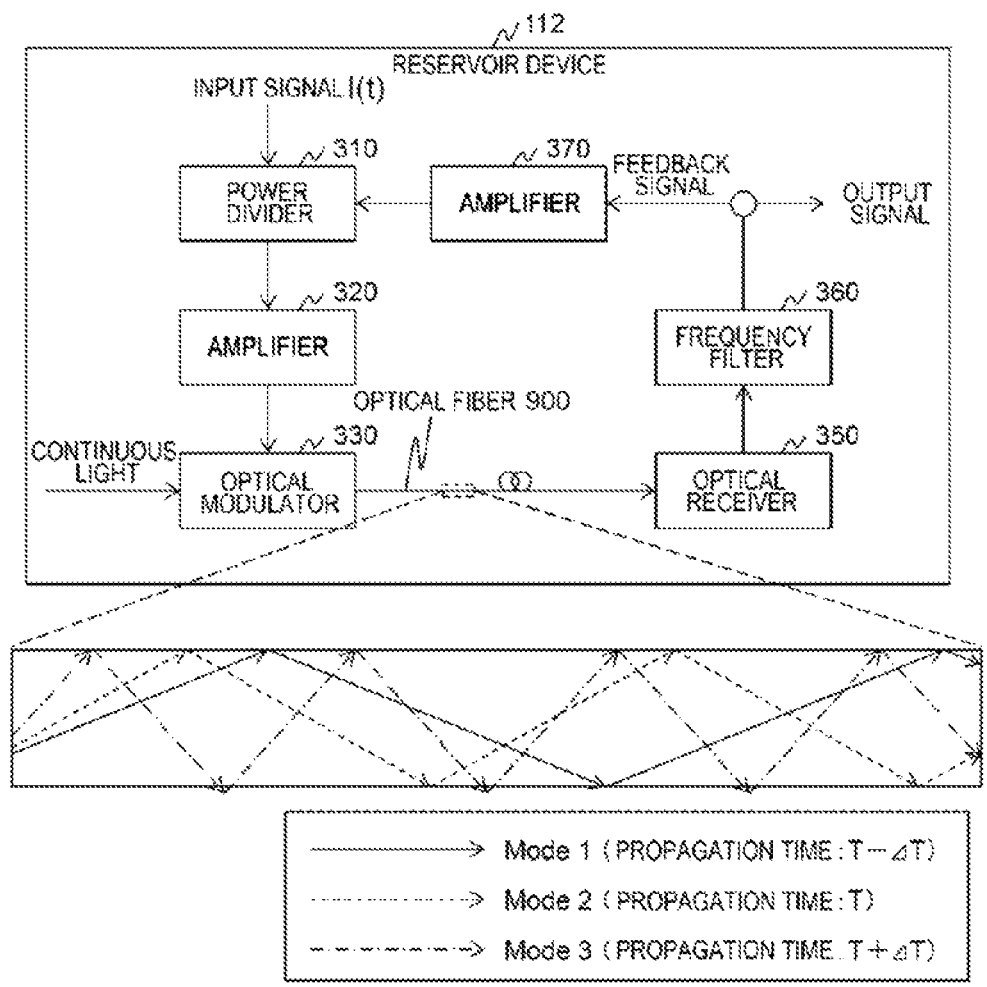
FIG. 9 is a diagram illustrating a configuration example of a reservoir device according to Example 2.

FIG. 9 is a diagram illustrating a configuration example of a reservoir device 112 according to Example 2.

The configuration of the reservoir device 112 other than an optical fiber 900 according to Example 2 is the same as that of the reservoir device 112 according to Example 1.

The optical fiber 900 according to Example 2 includes a conversion mechanism that divides and outputs an optical signal output from the optical modulator 330 according to a plurality of modes having different propagation times. Specifically, a multimode fiber with a large core diameter is used in a part of the optical fiber 900.

By using a super luminescence diode (SLD) with a large line width as a light source of continuous light instead of a laser and a multimode fiber with large dispersion, it is possible to widen the pulse width of the optical signal propagating through the optical fiber 900.

Instead of the optical fiber 900, an optical waveguide with a plurality of propagation modes may be used.

According to Example 2, it is possible to provide the reservoir device 112 that realizes the reservoir unit 1120 including the network of the virtual nodes 1160 having the diversity of the connection between the nodes, as in Example 1. Thus, it is possible to improve the computation ability while maintaining the advantages of the reservoir computing using a delayed feedback system.

Example 3

In Example 3, a process of the output device 113 is different. Hereinafter, differences between Example 1 and Example 3 will be mainly described.

The computer 100 according to Example 3 has the same configuration as that according to Example 1. The input device 111 and the reservoir device 112 according to Example 3 have the same configurations as those according to Example 1. In Example 3, a process executed by the output device 113 is different.

FIG. 10 is a diagram illustrating a concept of signal processing executed by the computer 100 according to Example 3. FIG. 14 is a diagram illustrating a concept of signal processing executed by a computer according to the related art.

The input device, the reservoir device 1200, and the output device according to the related art execute a process in synchronization with a period T. Accordingly, as illustrated in FIG. 14, an output signal R(T) calculated from the output device I(T) is read to calculate an output value.

On the other hand, the output device 113 according to Example 3 reads the output signal delayed by a minute time delay ΔT, as illustrated in FIG. 10. Here, ΔT is assumed to be less than τ.

In this case, as illustrated in FIG. 10, a value in which a state of a k-th virtual node 1160 and a state of a (k+1)-th virtual node 1160 are mixed is input to a k-th output node of the output device 113. This is equal to a case in which the state of the k-th virtual node 1160 and the state of the (k+1)-th virtual node 1160 are weighted and output.

A region 1001 including the state of the k-th virtual node 1160 is a value influenced by a (k−1)-th virtual node 1160, and a region 1002 including the state of the (k+1)-th virtual node 1160 is a value influenced by a k-th virtual node 1160.

According to Example 3, since the diversity of connection between the reservoir layer and the output layer increases, the computation ability is improved.

The invention is not limited to the foregoing examples and includes various modification examples. For example, in the foregoing examples, the configurations have been described in detail to facilitate the description of the invention and all the described configurations may not necessarily be included. Some of the configurations according to the examples can be added to, deleted from, or substituted with other configurations.

In the above-described examples, control lines and information lines indicate portions considered to be necessary for the description and are not necessarily all the control lines or the information lines of the product. All the configurations may be connected to each other.

What is claimed is:

1. A device that realizes calculation of a reservoir layer of reservoir computing, and comprises:
    an input unit;
    a nonlinear converter; and
    an output unit, wherein
    the nonlinear converter and the output unit are connected via a connection path having a delay mechanism that realizes a feedback loop giving a delay to a signal to be propagated,
    the input unit outputs a first signal generated by superimposing processing results of an input signal and a previous input signal output from the output unit to the nonlinear converter,
    the nonlinear converter outputs a second signal obtained by executing nonlinear conversion on the first signal,
    the output unit generates a third signal based on a signal received via the connection path, outputs the third signal to the input unit as a processing result of the previous input signal, and outputs the third signal to an external device, and
    the delay mechanism includes a conversion mechanism that generates a plurality of fourth signals with different delay times using the second signal, generates a fifth signal by superimposing the plurality of fourth signals, and outputs the fifth signal to the output unit.

2. The device according to claim 1, wherein
    the conversion mechanism is realized using one of a plurality of signal paths with different lengths and a signal path in which a plurality of modes with different propagation speeds are settable.

3. The device according to claim 2, wherein
    the conversion mechanism changes an intensity of at least one of the fourth signals and superimposes the plurality of fourth signals.

4. A computer that executes calculation of reservoir computing, and comprises:
    an input device configured to realize calculation of an input layer of the reservoir computing;
    a reservoir device configured to realize calculation of a reservoir layer of the reservoir computing; and
    an output device configured to realize calculation of an output layer of the reservoir computing,
    wherein the reservoir device includes an input unit, a nonlinear converter, and an output unit, wherein
    the nonlinear converter and the output unit are connected via a connection path having a delay mechanism that gives a time delay to a signal propagating from the nonlinear converter to the output unit,
    the input unit outputs a first signal generated by superimposing processing results of an input signal output from the input device and a previous input signal output from the output unit to the nonlinear converter,
    the nonlinear converter outputs a second signal obtained by executing nonlinear conversion on the first signal,
    the output unit generates a third signal based on a signal received via the connection path, outputs the third signal to the output unit as a processing result of the previous input signal, and outputs the third signal to an external device, and
    the delay mechanism includes a conversion mechanism that generates a plurality of fourth signals with different delay times using the second signal, generates a fifth signal by superimposing the plurality of fourth signals, and outputs the fifth signal to the output unit.

5. The computer according to claim 4, wherein
    the conversion mechanism is realized using one of a plurality of signal paths with different lengths and a signal path in which a plurality of modes with different propagation speeds are settable.

6. The computer according to claim 5, wherein
    the conversion mechanism changes an intensity of at least one of the fourth signals and superimposes the plurality of fourth signals.

7. The computer according to claim 6, wherein
    the output device delays a read timing of the third signal than an output timing of the third signal by a minute time.

\* \* \* \* \*